United States Patent
Zuo (10) Patent No.: US 10,189,528 B2
(45) Date of Patent: Jan. 29, 2019

(54) SELF-BALANCING DOUBLE-WHEELED ELECTRICAL SCOOTER

(71) Applicant: CHANGZHOU AIRWHEEL TECHNOLOGY CO., LTD. (CN), Jiangsu (CN)

(72) Inventor: Guogang Zuo, Jiangsu (CN)

(73) Assignee: CHANGZHOU AIRWHEEL, Jiangsu (CN)

( * ) Notice: Subject to any disclaimer, the term of this patent is extended or adjusted under 35 U.S.C. 154(b) by 1 day.

(21) Appl. No.: 15/582,490

(22) Filed: Apr. 28, 2017

(65) Prior Publication Data
US 2017/0233024 A1    Aug. 17, 2017

Related U.S. Application Data

(63) Continuation of application No. 15/511,377, filed as application No. PCT/CN2015/089591 on Sep. 15, 2015.

(30) Foreign Application Priority Data

Sep. 15, 2014    (CN) .................... 2014 2 0525822 U
Sep. 15, 2014    (CN) .................... 2014 2 0525825 U
(Continued)

(51) Int. Cl.
*B62K 11/00*    (2006.01)
*B60L 11/18*    (2006.01)
(Continued)

(52) U.S. Cl.
CPC ......... *B62K 11/007* (2016.11); *B60L 11/1805* (2013.01); *B60L 15/20* (2013.01);
(Continued)

(58) Field of Classification Search
None
See application file for complete search history.

(56) References Cited

U.S. PATENT DOCUMENTS 8,424,628 B1    4/2013   Schade
2004/0216550 A1  11/2004   Fallak et al.
(Continued)

FOREIGN PATENT DOCUMENTS

CN    101074039    11/2007
CN    201610202    10/2010
(Continued)

OTHER PUBLICATIONS

International Search Report for corresponding PCT International Application No. PCT/CN2015/089591 dated Mar. 24, 2016, 10 pages.
(Continued)

*Primary Examiner* — John D Walters
*Assistant Examiner* — Hilary L Johns
(74) *Attorney, Agent, or Firm* — Lee & Hayes, PC (57) ABSTRACT

A self-balancing double-wheeled electrical scooter is provided with an assembly for controlling a travel direction of the self-balancing double-wheeled electrical scooter, wherein, the travel direction of the self-balancing double-wheeled electrical scooter is controlled via a handle, a resilient recoverable component is provided between a scooter body and the handle, the handle is adapted for driving the resilient recoverable component to control the travel direction of the scooter, the resilient recoverable component comprises a stator (101), a rotor (112) and a resilient recoverable unit (111), the rotor (112) is mechanically connected to the handle in a fixed manner directly or indirectly, the stator (101) is mechanically connected to the scooter body (107) in a fixed manner directly or indirectly,
(Continued)

the stator (101) and the rotor (112) are connected in a resilient manner via the resilient recoverable unit, the resilient recoverable component further comprises an angle limiting device, the angle limiting device comprises a limiting cover (103) and a limiting pin (105), the limiting cover (103) is mechanically connected to the stator (101) in a fixed manner directly or indirectly, a limiting hole is provided on the limiting cover (103), the limiting pin (105) is mechanically connected to the rotor (112) in a fixed manner directly or indirectly, and the rotation of the rotor (112) causes the limiting pin (105) to rotate within a certain angle range inside the limiting hole on the limiting cover (103).

11 Claims, 7 Drawing Sheets

(30) Foreign Application Priority Data

Sep. 15, 2014 (CN) .................. 2014 2 0525841 U
Sep. 15, 2014 (CN) .................. 2014 2 0525971 U
Sep. 15, 2014 (CN) .................. 2014 2 0526020 U (51) Int. Cl.
*B60L 15/20* (2006.01)
*B62K 21/12* (2006.01)
*H04B 10/114* (2013.01)
*H02K 7/00* (2006.01)
*H02K 11/215* (2016.01)

(52) U.S. Cl.
CPC .......... *B62K 21/12* (2013.01); *H04B 10/1141* (2013.01); *B60L 2200/16* (2013.01); *B60L 2220/44* (2013.01); *B60L 2220/46* (2013.01); *B60L 2240/12* (2013.01); *B60L 2240/421* (2013.01); *B60L 2250/16* (2013.01); *B60L 2260/34* (2013.01); *H02K 7/003* (2013.01); *H02K 11/215* (2016.01); *Y02T 10/641* (2013.01); *Y02T 10/645* (2013.01); *Y02T 10/7005* (2013.01); *Y02T 10/72* (2013.01); *Y02T 10/7275* (2013.01)

(56) References Cited

U.S. PATENT DOCUMENTS

| | | |
|---|---|---|
| 2006/0082362 A1 | 4/2006 | Hino et al. |
| 2008/0039990 A1 | 2/2008 | Stevens et al. |
| 2009/0007716 A1 | 1/2009 | Soda et al. |
| 2014/0008138 A1* | 1/2014 | Kim .................. B60L 11/1877 180/216 |
| 2015/0353158 A1* | 12/2015 | Chang .................. B62K 3/002 180/6.5 |
| 2017/0191613 A1 | 7/2017 | Liu et al. |
| 2017/0253287 A1 | 9/2017 | Zuo |

FOREIGN PATENT DOCUMENTS

| | | |
|---|---|---|
| CN | 102060080 | 5/2011 |
| CN | 102069872 | 5/2011 |
| CN | 202508230 | 10/2012 |
| CN | 202879697 | 4/2013 |
| CN | 203244742 | 10/2013 |
| CN | 203372330 | 1/2014 |
| CN | 103552635 | 2/2014 |
| CN | 204056178 | 12/2014 |
| CN | 204077954 | 1/2015 |
| CN | 204077958 | 1/2015 |
| CN | 204077959 | 1/2015 |
| CN | 204077975 | 1/2015 |
| CN | 204110257 | 1/2015 |
| DE | 202008006289 | 9/2008 |
| WO | WO2011051372 | 5/2011 |

OTHER PUBLICATIONS

European Office Action for corresponding European Patent Application No. 15841248.6 dated Nov. 17, 2017, 17 pages.

Office Action for U.S. Appl. No. 15/511,377, dated May 18, 2018, Zuo, "Self-Balancing Double Wheeled Electrical Scooter", 6 pages.

* cited by examiner

SELF-BALANCING DOUBLE-WHEELED ELECTRICAL SCOOTER

This Application claims priority to U.S. patent application Ser. No. 15/511,377, filed Mar. 15, 2017, which is a National Phase application of PCTCN2015089591, filed Sep. 15, 2015, which claims priority to CN 201420526020.8, filed Sep. 14, 2014, all of which are incorporated herein by reference.

TECHNICAL FIELD

The present invention relates to a self-balancing double-wheeled electrical scooter, which pertains to the technical field of traffic tools.

BACKGROUND

With the continuous development of society and economics, more and more traffic tools emerge day by day, city roads become more and more crowded, and the contradictions between road resource and motor vehicle amount become increasingly acute. For China with more than 1.3 billion population, it is already unrealistic to make city roads adapt to our traffic tools, and the only way out is to make our traffic tools adapt to our roads. In the meantime, a series of environmental problems such as ozone sphere holes and sea level rising are bothering us, and one of the important reasons that causes such conditions is motor vehicle tail gas emission. Therefore, we need an energy-saving, environmental friendly traffic tool that is able to move through crowds, in order to solve these increasingly acute contradictions.

The self-balancing electrical scooter that begins to circulate on the market nowadays is also called Segway, uses lithium cells as electrical power source, is environmental friendly and energy-saving, and may become a new-generation traffic tool. Its operation principle is based on "dynamic stability" to maintain vehicle balance in the running direction by automatic balancing ability of the electrical scooter itself. Generally, a gyroscope, i.e., a body-sensing balancing system, is provided inside the scooter body, real-time conditions of the scooter body is sensed by the body-sensing balancing system so as to transmit the information to an information processing system, and after the sensed information is processed by the information processing system, a proper instruction is computed and sent to a motor, thereby controlling the motor to achieve a balance status of scooter body running, so that a rider can control the acceleration and deceleration of the scooter body by moving his/her gravity center so as to achieve running balance. However, the self-balancing electrical scooters currently on the market have the following problems:

1) The self-balancing electrical scooter senses running in the front-back direction by the gyroscope, i.e., the body-sensing balancing system, but for running in the left-right direction, the self-balancing electrical scooter controls its displacement by force exerted on its handle, so the connection structure between the handle and the scooter body directly influences control operation in the left-right direction of the scooter body;
2) The operation switch of the self-balancing electrical scooter is configured on the handle, the balancing system of the electrical scooter is not working before the scooter is turned on, and thus the scooter is in an unbalanced status, rendering the rider unable to stand on the scooter; the rider normally stand beside the scooter to turn on the switch on the handle and exert a force on the handle, the force exerted on the handle generates an instruction for the scooter to run in the front-back direction or in the left-right direction, and the scooter starts to run, because such running is not controlled consciously by the rider, the scooter probably would run into the rider, or it is difficult and dangerous for the rider to stand onto the moving scooter due to relative motion between the rider and the scooter;
3) The connection performance between the wheels and the scooter body is poor, and there is a risk of the wheels detaching from the scooter body;
4) The handle of the self-balancing electrical scooter is not foldable, which wastes space and is not convenient to carry around;
5) The connection structure between the motor shaft and the wheels of the self-balancing electrical scooter is complicated and causes unstable running.

SUMMARY OF THE INVENTION

A first technical problem to be solved by the present invention is the connection structure between the handle and the scooter body of the self-balancing electrical scooter in prior art directly influences control operation in the left-right direction of the scooter body. A second technical problem to be solved by the present invention is the starting-up of the self-balancing electrical scooter in prior art has certain difficulty and a large risk. A third technical problem to be solved by the present invention is the connection performance between the wheels and the scooter body of the self-balancing electrical scooter in prior art is poor and has a risk of the wheels detaching from the scooter body. A fourth technical problem to be solved by the present invention is the handle of the self-balancing electrical scooter in prior art is not foldable, which wastes space and is not convenient to carry around. A fifth technical problem to be solved by the present invention is the connection structure between the motor shaft and the wheels of the self-balancing electrical scooter in prior art is complicated and causes unstable running.

In order to solve at least one of the above-mentioned technical problems, according to a first aspect of the present invention, the embodiments of the present invention disclose an assembly for controlling a travel direction of a self-balancing double-wheeled electrical scooter, wherein, the travel direction of the self-balancing double-wheeled electrical scooter is controlled via a handle on a scooter body, a resilient recoverable component is provided between the scooter body and the handle, the handle is adapted for driving the resilient recoverable component to control the travel direction of the scooter, the resilient recoverable component comprises a stator, a rotor and a resilient recoverable unit, the rotor is mechanically connected to the handle in a fixed manner directly or indirectly, the stator is mechanically connected to the scooter body in a fixed manner directly or indirectly, the stator and the rotor are connected in a resilient manner via the resilient recoverable unit, which has a simple mechanism and is easy to manufacture in an industrialized manner. When the handle moves under external force, it drives the rotor to move by the same angle; when the external force disappears, the rotor returns to its original status under an elastic recovery force of the resilient recoverable unit and in the meantime drives the handle to return to its original status, so that the controllability of direction turning of the electrical scooter is improved. The stator and rotor mentioned herein has nothing to do with a motor, the stator refers to a stationary part in the resilient recoverable component, the rotor refers to a part rotatable relative to the stator in the resilient recoverable component, and the rotor rotates around a center axis of the stator.

In the assembly for controlling a travel direction of a self-balancing double-wheeled electrical scooter, the stator is disposed inside the rotor; or the rotor is disposed inside the stator. The resilient recoverable unit is filled in the gap between the stator and the rotor so that the stator and the rotor are connected integrally via the resilient recoverable unit, the rotor driven by an external force rotates relative to its initial position, causing the resilient recoverable unit to deform, and when the external driving force exerted on the rotor weakens or disappears, the elastic recovery force of the resilient recoverable unit causes the rotor to move towards its initial position or return to its initial position.

In the assembly for controlling a travel direction of a self-balancing double-wheeled electrical scooter, a position limiting component is provided between the stator and the rotor, for preventing all movements of the rotor relative to the stator other than rotation.

In the assembly for controlling a travel direction of a self-balancing double-wheeled electrical scooter, the stator and the rotor are connected in a resilient manner via the resilient recoverable unit, and the resilient recoverable unit is a rubber unit or a silicone unit that is injection molded between the stator and the rotor, for increasing the fastening strength between the resilient recoverable unit and the stator as well as the rotor.

In the assembly for controlling a travel direction of a self-balancing double-wheeled electrical scooter, in order to increase the elastic recovery property of the rubber unit to allow a rider to more conveniently and comfortably control the handle with an optimum force, the ingredients of the rubber unit include 50%-65% by weight of raw rubber NR, 15%-25% by weight of carbon black N774, 7%-15% by weight of carbon black N330, 3%-9% by weight of naphthenic oil, 1%-5% by weight of zinc oxide, 0.1%-0.5% by weight of antiager MB, 0.1%-0.5% by weight of stearic acid, 0.1%-0.5% by weight of RD, 0.1%-0.5% by weight of WB212, 0.1%-0.5% by weight of accelerant DM, and 0.5%-1.2% by weight of accelerant CZ.

In the assembly for controlling a travel direction of a self-balancing double-wheeled electrical scooter, the resilient recoverable unit in the resilient recoverable component is a rubber unit prepared by the following manner: according to a feedstock total mass of 10 kg, raw rubber NR passes between two rollers on an open mill for 5 times under 100□±2□ for a duration of 75-85 seconds, carbon black N774, carbon black N330, naphthenic oil, zinc oxide, antiager MB, stearic acid, RD and WB212 are added for mixing under 110□±2□ for a duration of 110-130 seconds, more naphthenic oil is added for mixing under 120□±2□ for a duration of 90-110 seconds with surface cleaning for a duration of 150-170 seconds, after more than 8 hours of storing, accelerant DM, accelerant CZ and sulfur are added for mixing under 50□-60□ for a duration of 75-85 seconds, and the resultant is compressed into sheets by rollers, thereby completing the rubber preparation.

In the assembly for controlling a travel direction of a self-balancing double-wheeled electrical scooter, in order to increase the stripping strength between the resilient recoverable unit and the stator as well as the rotor, the contact surface between the stator and the resilient recoverable unit or between the rotor and the resilient recoverable unit is a rough surface or a dented patterned surface.

In the assembly for controlling a travel direction of a self-balancing double-wheeled electrical scooter, the resilient recoverable component between the scooter body and the handle further comprises an angle limiting device which limits rotation of the rotor to a certain angle range and correspondingly limits rotation of the handle to this angle range.

In the assembly for controlling a travel direction of a self-balancing double-wheeled electrical scooter, the angle limiting device that limits rotation of the rotor to a certain angle range comprises a limiting cover and a limiting pin, the limiting cover is mechanically connected to the stator in a fixed manner directly or indirectly, a limiting hole is provided on the limiting cover, the limiting pin is mechanically connected to the rotor in a fixed manner directly or indirectly, and the rotation of the rotor causes the limiting pin to rotate within a certain angle range inside the limiting hole on the limiting cover.

In the assembly for controlling a travel direction of a self-balancing double-wheeled electrical scooter, the handle and the rotor are mechanically connected in a fixed manner via a handle base, the limiting pin is fixed on the handle base, and the handle, when driven by an external force, is adapted for driving the handle base and the limiting pin on the handle base to rotate within a certain angle range limited by the limiting hole on the limiting cover.

In the assembly for controlling a travel direction of a self-balancing double-wheeled electrical scooter, the angle range that the rotation of the rotor is limited to and correspondingly the rotation of the handle is limited to is preferably from −30° to 30°. Rotation within such an angle range is comfortable for a rider to operate.

According to a second aspect of the present invention, the embodiments of the present invention disclose a device for collecting information of change of handle position that is set on the assembly for controlling a travel direction of a self-balancing double-wheeled electrical scooter, wherein, the resilient recoverable component between the scooter body and the handle is further provided with the device for collecting information of change of handle position in order to capture instant information of change of the handle position when the scooter body makes a turn.

The device for collecting information of change of handle position comprises a signal capturing and processing unit and a signal emitting unit.

In the device for collecting information of change of handle position, the signal emitting unit is directly or indirectly fixed to the rotor which is mechanically connected to the handle in a fixed manner directly or indirectly, the signal capturing and processing unit is directly or indirectly fixed to the stator which is mechanically connected to the scooter body in a fixed manner directly or indirectly, the rotation of the rotor relative to the stator drives the signal emitting unit to rotate relative to the signal capturing and processing unit. The signal emitting unit emits different signals associated with its different positions relative to the signal capturing and processing unit during its rotation process, the signal capturing and processing unit captures and processes different signals and then transmits corresponding information to a control unit, the control unit processes and transmits corresponding information to motors, and accordingly the motors drive the two wheels differently.

In the device for collecting information of change of handle position, the signal emitting unit is directly or indirectly fixed to the stator which is mechanically connected to the scooter body in a fixed manner directly or indirectly, the signal capturing and processing unit is directly or indirectly fixed to the rotor which is mechanically connected to the handle in a fixed manner directly or indirectly, the rotation of the rotor relative to the stator drives the signal capturing and processing unit to rotate relative to the signal emitting unit. The signal capturing and processing unit receives different signals associated with its different positions relative to the signal emitting unit during its rotation process, the signal capturing and processing unit captures and processes different signals and then transmits corresponding information to a control unit, the control unit processes and transmits corresponding information to motors, and accordingly the motors drive the two wheels differently.

In the device for collecting information of change of handle position, the signal emitting unit is a magnet, and the signal capturing and processing unit is a linear Hall sensor. The linear Hall sensor captures and processes information of change of the magnetic field caused by change of position of the magnet which rotates relative to the linear Hall sensor, and then transmits corresponding information to a control unit, the control unit processes and transmits corresponding information to motors, and accordingly the motors drive the two wheels differently.

In the device for collecting information of change of handle position, the magnet comprises a pair of magnets which are arranged in a central symmetric manner and are directly or indirectly mechanically fixed to the stator or the rotor, with a center thereof being a rotation center of the rotor, and the linear Hall sensor is fixed at a location corresponding to the center of the magnets. The linear Hall sensor captures and processes information of change of the magnetic field related to change of the rotation angle relative to the magnets, and then transmits corresponding information to a control unit to compute control values for motors of the two wheels, the control unit transmits corresponding information to motors, and accordingly the motors drive the two wheels differently to produce a speed difference between the two wheels for making a turn.

According to a third aspect of the present invention, in order to reduce the risk level when a rider turns on a self-balancing double-wheeled electrical scooter, the embodiments of the present invention disclose an assembly for turning on and turning off operation of a self-balancing double-wheeled electrical scooter, the assembly comprises a signal sensing device, a resilient unit and a signal blocking unit, the signal sensing device is set in a chassis of the self-balancing double-wheeled electrical scooter under a foot pedal, the resilient unit is arranged above the signal sensing device and directly facing the signal sensing device, the signal blocking unit is connected to the resilient unit in a fixed manner and is arranged under the resilient unit and perpendicularly corresponding to a signal transmission path of the signal sensing device. This assembly is also called a gravity sensing assembly and is controlled by a foot of a rider. When a foot of the rider is standing on the assembly for turning on and turning off operation of the self-balancing double-wheeled electrical scooter, under the action of gravity, the resilient unit deforms and causes the signal blocking unit to move vertically toward the signal transmission path and block the sensing signal, and accordingly the operation system of the electrical scooter is turned on. As the rider is already standing on the scooter when the scooter starts to run, the human body and the scooter body can travel synchronously, thereby improving safety.

In the assembly for turning on and turning off operation of a self-balancing double-wheeled electrical scooter, the signal sensing device comprises a circuit board, as well as an optical signal emitter, an optical signal receiver, a signal transmission port, a current-limiting resistor, a filter capacitor, a load resistor which are all mounted on the circuit board.

In the assembly for turning on and turning off operation of a self-balancing double-wheeled electrical scooter, after electrical power is filtered by the filter capacitor to eliminate any power impurity interference and current-limited by the current-limiting resistor and then fed to the optical signal emitter, the optical signal emitter is configured to send a sensing signal in the form of light to the optical signal receiver, the optical signal receiver is configured to convert the received optical signal into electrical current signal which is then converted into voltage signal via the load resistor and transmitted to the signal transmission port and after that sent to a controller of the self-balancing double-wheeled electrical scooter, and when the controller receives the voltage signal, the operation of the self-balancing double-wheeled electrical scooter is controlled at a shut-down state.

In the assembly for turning on and turning off operation of a self-balancing double-wheeled electrical scooter, the signal sensing device is set in the chassis of the self-balancing double-wheeled electrical scooter, the foot pedal on the chassis is provided with an aperture which is correspondingly located above the signal transmission path of the signal sensing device, the resilient unit is arranged above the aperture of the foot pedal in a protruding manner, the signal blocking unit on the resilient unit is arranged to extend through the aperture, when the resilient unit is deformed downwards by an external force, the signal blocking unit is configured to block the sensing signal of the signal sensing device.

In the assembly for turning on and turning off operation of a self-balancing double-wheeled electrical scooter, when the sensing signal of the signal sensing device is blocked by the signal blocking unit, the optical signal sent by the optical signal emitter cannot be transmitted to the optical signal receiver, so that the controller of the self-balancing double-wheeled electrical scooter does not receive any voltage signal from the signal sensing device, thereby the operation of the self-balancing double-wheeled electrical scooter is controlled at an actuated state.

In the assembly for turning on and turning off operation of a self-balancing double-wheeled electrical scooter, the resilient unit is fixed to the foot pedal in a sealed manner.

In the assembly for turning on and turning off operation of a self-balancing double-wheeled electrical scooter, a foot pad is further provided above the resilient unit on the foot pedal, when no downward force is exerted on the foot pad, i.e., when the foot of the rider does not tread on the foot pad, there is no action of interaction force between the foot pad and the resilient unit or their interaction force is not enough to deform the resilient unit, causing the operation of the self-balancing double-wheeled electrical scooter to be at a shut-down state. When the foot of the rider treads on the foot pad, the interaction force between the foot pad and the resilient unit deforms the resilient unit, causing the sensing signal to be blocked and thus the operation of the self-balancing double-wheeled electrical scooter to be at an actuated state.

According to a fourth aspect of the present invention, the embodiments of the present invention disclose a self-balancing double-wheeled electrical scooter that comprises one or more of the aforementioned assembly for turning on and turning off operation of the self-balancing double-wheeled electrical scooter, wherein, when the sensing signal of at least one signal sensing device is blocked by the signal blocking unit, the assembly for turning on and turning off operation of the self-balancing double-wheeled electrical scooter is turned on, and the operation of the self-balancing double-wheeled electrical scooter enters an actuated state.

According to a fifth aspect of the present invention, the embodiments of the present invention disclose a fixed connection structure between a wheel and a scooter body of a self-balancing double-wheeled electrical scooter, wherein, the wheels are mechanically fixed to the scooter body through a respective axle, the scooter body is fixed to the axle by means of a fastening component and a flange nut screwed tightly on the axle. Because the gasket and the nut of the flange nut are integrally formed, with anti-slide teeth on the flange surface, the contact area between the nut and the work piece is increased, and as compared to a combination of an ordinary nut plus a gasket, the flange nut is firmer and has larger pulling force.

In the fixed connection structure between a wheel and a scooter body of a self-balancing double-wheeled electrical scooter, besides the flange nut, the fastening component that fastens the axle to the scooter body further comprises a crescent unit, an adjusting steel sheet and an axle sleeve, wherein, the axle sleeve is made of material harder than the scooter body, and the scooter body is fixed to the axle sleeve by pressure casting so as to form an integral body; the axel is mounted in the axle sleeve, and because the axle sleeve is made of hard material, the axel would not deform as a result of exerted force; in order to connect the axle and the scooter body more firmly, an end of the axel is further fastened to the scooter body by the crescent unit, the adjusting steel sheet and the flange nut.

In the fixed connection structure between a wheel and a scooter body of a self-balancing double-wheeled electrical scooter, the crescent unit of the fastening component that fastens the axle to the scooter body serves as a buffer between the axle sleeve and the flange nut, and effectively increases the fastening strength of the flange nut. The flange nut is generally made of rigid material, preferably hardened by quenching.

In the fixed connection structure between a wheel and a scooter body of a self-balancing double-wheeled electrical scooter, the crescent unit of the fastening component that fastens the axle to the scooter body comprises two crescent pieces provided between the flange nut and the axle sleeve, with concave portions of the two crescent pieces clamped on the axle from opposite directions, and the adjusting steel sheet is fitted between the crescent unit and the scooter body. On one hand, because the surface of the scooter body is not smooth, by using the steel sheet as a medium, the friction force between the crescent unit and the scooter body is reduced, and the flange nut is easy to be inserted due to the lubrication effect of the steel sheet; on the other hand, by selecting a steel sheet with a suitable thickness according to the gap size between the crescent unit and the scooter body, the integral firmness is increased.

In the fixed connection structure between a wheel and a scooter body of a self-balancing double-wheeled electrical scooter, a surface opposite the concave portion of the crescent piece is a slanted surface which skews towards the axle on a side near the wheel, and the surface with the screw hole on the scooter body also has slanted portions. When the flange nut pushes the crescent pieces to screw toward the wheel, because the surface with the screw hole has slanted portions, the screw hole becomes smaller and smaller. The corresponding surface on the scooter body skews towards the axle on a side near the wheel in a manner corresponding to that of the crescent piece, and the adjusting steel sheet is fitted between the crescent unit and the scooter body. Therefore, during a continuous screwing-in process, the contact between the flange nut and the crescent unit, between the crescent unit and the axel, between the crescent unit and the adjusting steel sheet, as well as between the adjusting steel sheet and the scooter body would become more and more firm.

In the fixed connection structure between a wheel and a scooter body of a self-balancing double-wheeled electrical scooter, the axel is provided with a hole at a position behind the flange nut and adjacent the flange nut, the fastening component further comprises a split pin which is set in the hole of the axel. The split pin is configured to prevent the flange nut from being screwed out. By further providing a split pin on the axel to secure the flange nut, the flange nut is prevented from loosening, and screwing out of the flange nut is effectively prevented.

In the fixed connection structure between a wheel and a scooter body of a self-balancing double-wheeled electrical scooter, the scooter body is fixed to the axle sleeve by pressure casting. By using an axle sleeve made of material harder than the scooter body as a medium between the axle and the scooter body, the weight bearing strength of the scooter is increased.

In the fixed connection structure between a wheel and a scooter body of a self-balancing double-wheeled electrical scooter, the axle sleeve is pressed into the scooter body by means of an interference fit.

In the fixed connection structure between a wheel and a scooter body of a self-balancing double-wheeled electrical scooter, the axle sleeve of the fastening component that fastens the axle to the scooter body is fixed to the scooter body by pressure casting. As the scooter body is fixed to the axle sleeve by pressure casting, an outer surface of the axle sleeve contacts the scooter body in a fitted manner. The outer surface of the axle sleeve is rough or has dented portions thereon, which effectively increases the binding force to the scooter body. By machining the outer surface of the axle sleeve to be rough or dented, the stripping force in the horizontal direction required for stripping the axle sleeve and the scooter body apart becomes larger, so that the fixing between the axle sleeve and the scooter body is firmer, thereby effectively preventing the axle sleeve from detaching from the scooter body.

In the fixed connection structure between a wheel and a scooter body of a self-balancing double-wheeled electrical scooter, for the axle sleeve of the fastening component that fastens the axle to the scooter body, an inner bore of the axle sleeve has unequal diameters at its two ends, with the diameter at the end near the wheel larger than that of the end away from the wheel, the line connecting the peripheries of the two ends has an angle of 1° to 3° relative to a horizontal plane.

According to a sixth aspect of the present invention, the embodiments of the present invention disclose a handle for a self-balancing electrical scooter which has simple structure with foldable handle bars to save space, the handle can be folded in a non-riding state for convenience of carrying around, wherein, the handle comprises an upper handle bar, a lower handle bar, a foldable mechanism between the upper and lower handle bars, and a hand-held part, the upper handle bar and the lower handle bar are connected in a foldable manner by the foldable mechanism, the hand-held part is mechanically fixed to the upper handle bar.

In the handle for a self-balancing electrical scooter, the hand-held part has a scooter body display device and/or a scooter body control device arranged between two handle levers.

In the handle for a self-balancing electrical scooter, the scooter body control device arranged between the two handle levers comprises a scooter body Bluetooth control unit, a scooter remote upgrade control unit, and a scooter power source remote switch unit.

In the handle for a self-balancing electrical scooter, the upper handle bar and the lower handle bar are connected in a fixed foldable manner by the foldable mechanism.

In the handle for a self-balancing electrical scooter, the foldable mechanism comprises a foldable member, a fastener for limiting the fold position and a sealing member. Wherein, the foldable member is a hinge which comprises an upper hinge piece, a lower hinge piece and a rotation shaft for connecting the upper and lower hinge pieces, the upper hinge piece and the lower hinge piece are respectively fixed on the upper handle bar and the lower handle bar. Thus the upper handle bar and the lower handle bar can be connected or folded together by opening and closing of the hinge. Wherein, the connecting fastener is arranged for connecting the upper handle bar and the lower handle bar in a fixed manner, and comprises a buckle hook, a buckle ring, a buckle bracket and a buckle locking member, with the buckle hook fixed on one of the upper and lower handle bars, and with the buckle ring, the buckle bracket and the buckle locking member fixed on the other of the upper and lower handle bars, the buckle ring is able to be buckled onto the buckle hook so as to form fixed connection between the upper and lower handle bars, the buckle ring is mechanically connected to the buckle bracket in a rotatable manner, and the buckle bracket is locked by the buckle locking member.

In the handle for a self-balancing electrical scooter, the sealing member is made of elastic waterproof material and is fixed in a sealed manner around a connecting interface between the upper handle bar and the lower handle bar, for allowing the interface connection between the upper handle bar and the lower handle bar to be a seal connection with waterproof effect. In the meantime, by using the elastic material, the hand-held part has certain elastic recovery buffer effect for a rider travelling on a bumpy road, which effectively reduces bumpy feeling for the hands of the rider.

In the handle for a self-balancing electrical scooter, the sealing member is made of rubber or silicone, with a cable hole provided thereon for a transmission cable to pass through, so that a transmission cable for connecting the scooter body display device and/or the scooter body control device arranged between the two handle levers to a power source as well as a control unit in the chassis.

In the handle for a self-balancing electrical scooter, the transmission cable is arranged in a foldable tube that is clamped in the cable hole, and sealing is formed between the cable hole and an outer wall of the foldable tube. On one hand, the transmission cable is effectively prevented from being exposed; on the other hand, the foldable tube can stretch along with folding of the upper handle bar and the lower handle bar, so that the folding of the upper handle bar and the lower handle bar would not damage the transmission cable.

In the handle for a self-balancing electrical scooter, the upper handle bar and the lower handle bar are respectively provided with a groove, a decorative LED lamp is further received in the groove, and transparent silicone is provided on the outside for encapsulating the LED lamp inside the groove.

In the handle for a self-balancing electrical scooter, for easy of assembling, the handle is provided with a power source port and a signal transmission control interface port which are respectively connected in a pluggable manner to a corresponding power source port and a corresponding signal transmission control interface port extending from within the chassis.

In the handle for a self-balancing electrical scooter, the handle is further provided with a handle base connected to the chassis directly or indirectly, the power source port and signal transmission control interface port of the handle are connected to corresponding ports of the handle base in a pluggable manner, and the handle and the handle base are further mechanically connected in a fixed manner by screw bolts.

In the handle for a self-balancing electrical scooter, the upper handle bar and the hand-held part are connected in a pluggable manner and fastened together by screw bolts.

According to a seventh aspect of the present invention, the embodiments of the present invention disclose a connection structure between a motor shaft of a hub motor and a wheel of a self-balancing double-wheeled electrical scooter, which has simple structure and is easy to assemble, and can bring steady travel conditions for the scooter. The connection between the motor shaft and the wheel in the present invention does not require any extra component, and it only requires putting the motor shaft into a wheel bracket to complete the assembly. A motor bracket of the wheel is connected to a stator of the hub motor, the motor shaft of the wheel is fixed at a center of the motor bracket of the wheel and extending inside a central hole of the motor bracket, with the diameter of the central hole of the motor bracket for fixing the motor shaft smaller than the diameter of the motor shaft, the motor shaft is pressed into the central hole of the motor bracket to be stuck in the central hole of the motor bracket, without any possibility of displacement between the shaft and the bracket hole. Fastening components such as screw bolts is not required to be added onto the shaft, and no welding is needed between the motor shaft and the bracket, as the welding would cause the motor shaft and the bracket to be non-detachable during later maintenance of the scooter.

In the connection structure between a motor shaft of a hub motor and a wheel of a self-balancing double-wheeled electrical scooter, the difference value obtained by subtracting a minimum diameter of the motor shaft fixed in the central hole of the motor bracket from a maximum diameter of the central hole of the motor bracket is an interference value $Y_{min}$ corresponding to the loosest fitting state of the motor shaft and the central hole, the difference value obtained by subtracting a maximum diameter of the motor shaft fixed in the central hole of the motor bracket from a minimum diameter of the central hole of the motor bracket is an interference value $Y_{max}$ corresponding to the tightest fitting state of the motor shaft and the central hole, and $Y_{min} \leq -0.01$ mm, $Y_{max} \geq -0.05$ mm, $Y_{min} \geq Y_{max}$.

In the connection structure between a motor shaft of a hub motor and a wheel of a self-balancing double-wheeled electrical scooter, the motor shaft of the wheel is fixed in the central hole of the motor bracket of the wheel, the motor shaft is provided with a bore which communicates with a corresponding bore on the inner wall of the central hole of the motor bracket, and a pin is inserted within the bore. With the pin inserted into the bore, the shaft and the bracket are further fastened, without any displacement in the left-right direction.

In the connection structure between a motor shaft of a hub motor and a wheel of a self-balancing double-wheeled electrical scooter, the wheel is further provided with wheel lateral covers on both lateral sides, the wheel lateral covers are mechanically connected to the motor shaft through bearings, and interference-fit connections are formed between the wheel lateral covers and the bearings as well as between the bearings and the motor shaft, with $Y_{min} \leq -0.01$ mm, $Y_{max} \geq -0.05$ mm, $Y_{min} \geq Y_{max}$. This is more convenient as compared to other techniques, and the structure is simplified, with a more aesthetic appearance.

In the connection structure between a motor shaft of a hub motor and a wheel of a self-balancing double-wheeled electrical scooter, the motor shaft is further provided with a cable positioning hole for accommodating a connecting cable between the hub motor and the scooter body, the cable positioning hole is arranged at the connecting position of the motor shaft and one of the bearings, for allowing the connecting cable between the hub motor and the scooter body to pass through.

In the connection structure between a motor shaft of a hub motor and a wheel of a self-balancing double-wheeled electrical scooter, for allowing the connecting cable to more easily pass through, the diameter of the cable positioning hole is larger than the outer diameter of the connecting cable between the hub motor and the scooter body, and is smaller than or equal to 1.5 times the outer diameter of the connecting cable between the hub motor and the scooter body.

In the connection structure between a motor shaft of a hub motor and a wheel of a self-balancing double-wheeled electrical scooter, for allowing the connecting cable to easily extend in or extend out, the length of the cable positioning hole is larger than the bearing width plus 2 times the outer diameter of the connecting cable between the hub motor and the scooter body, the bearing is disposed upon the cable positioning hole, with two ends of the cable positioning hole arranged on the inner side and outer side of the bearing.

According to an eighth aspect of the present invention, the embodiments of the present invention disclose a foldable mechanism of a foldable handle of a self-balancing electrical scooter, wherein, the handle bar is made into two or more sections by using the foldable mechanism of the handle, thereby reducing the storage space required by the self-balancing electrical scooter, and the respective sections of handle bars can be connected together by the foldable mechanism, the foldable mechanism comprises a foldable member, a connecting fastener and a sealing member, the foldable member switches the handle between a folded position and a connected position, the connecting fastener is arranged to fasten the two or more sections of handle bars into the connected position, the sealing member is arranged to seal a connecting interface between an upper handle bar and a lower handle bar.

In the foldable mechanism of a foldable handle of a self-balancing electrical scooter, the foldable member can be selected to be a hinge which comprises an upper hinge piece, a lower hinge piece and a rotation shaft for connecting the upper and lower hinge pieces, the upper hinge piece and the lower hinge piece are respectively fixed on the upper handle bar and the lower handle bar. Thus the upper handle bar and the lower handle bar can be connected or folded together by opening and closing of the hinge.

In the foldable mechanism of a foldable handle of a self-balancing electrical scooter, the connecting fastener is arranged for connecting the upper handle bar and the lower handle bar in a fixed manner, and comprises a buckle hook, a buckle ring and a buckle bracket, with the buckle hook fixed on one of the upper and lower handle bars, and with the buckle ring and the buckle bracket fixed on the other of the upper and lower handle bars, the buckle ring is able to be buckled onto the buckle hook so as to form fixed connection between the upper and lower handle bars, the buckle ring is mechanically connected to the buckle bracket in a rotatable manner.

In the foldable mechanism of a foldable handle of a self-balancing electrical scooter, the buckle bracket comprises a buckle upper casing and a buckle lower casing, the buckle lower casing is fixed on the handle, the buckle upper casing is connected on the buckle lower casing in a rotatable manner by means of a buckle rotation shaft, the buckle ring is connected on the buckle upper casing in a rotatable manner, when the buckle upper casing is opened, the buckle ring is at an entering position corresponding to the buckle hook, when the buckle upper casing is then closed, the buckle ring becomes connected to the buckle hook in a fixed manner, and when the buckle upper casing is opened again, the buckle ring slides off from the buckle hook.

The foldable mechanism of a foldable handle of a self-balancing electrical scooter further comprises a buckle locking member for locking the buckle bracket by keeping the buckle upper casing and the buckle lower casing locked in a closed state, so as to prevent the buckle ring from sliding off from the buckle hook.

In the foldable mechanism of a foldable handle of a self-balancing electrical scooter, the buckle locking member comprises a spring, a buckle locking piece and a buckle locking hook, the buckle locking piece is set on the buckle upper casing, the spring is set on the buckle locking piece, the buckle locking hook is set on the buckle lower casing, and the buckle upper casing is locked onto the buckle lower casing by means of the buckle locking piece being hooked onto the buckle locking hook.

In the foldable mechanism of a foldable handle of a self-balancing electrical scooter, the buckle locking piece comprises a buckle locking piece pressing portion, a buckle locking piece aperture and buckle locking piece horns, the spring comprises two springs arranged in parallel, the buckle locking piece is transversely inserted in the buckle upper casing, with the buckle locking piece pressing portion placed outside one lateral side of the buckle upper casing, and with the buckle locking piece horns extending out from the other lateral side of the buckle upper casing, the springs are set on the buckle locking piece horns inside the buckle upper casing, with one end of the spring pushed against the starting end of the buckle locking piece horn, and with the other end of the spring pushed against an inner lateral wall of the buckle upper casing, the buckle locking piece aperture is provided with a protrusion for restraining the buckle locking piece horns from completely entering the buckle upper casing, this protrusion abuts an inner side of the buckle upper casing opposite the buckle locking piece pressing portion when the springs stretches to a maximum extent within the buckle locking member, the buckle locking hook hooks itself onto an edge of the buckle locking piece aperture when the buckle upper casing is closed, and when the buckle locking piece pressing portion is pressed, displacement of the buckle locking piece aperture occurs, causing the buckle locking hook to break away from the edge of the buckle locking piece aperture and enter the buckle locking piece aperture, so that the buckle upper casing becomes free to be opened.

In the foldable mechanism of a foldable handle of a self-balancing electrical scooter, the sealing member is made of elastic waterproof material and is fixed in a sealed manner around a connecting interface between the upper handle bar and the lower handle bar, for allowing the interface connection between the upper handle bar and the lower handle bar to be a seal connection with waterproof effect. In the meantime, by using the elastic material, the hand-held part has certain elastic recovery buffer effect for a rider travelling on a bumpy road, which effectively reduces bumpy feeling for the hands of the rider.

In the foldable mechanism of a foldable handle of a self-balancing electrical scooter, the sealing member is made of rubber or silicone, with a cable hole provided thereon for a transmission cable to pass through, so that a transmission cable for connecting the scooter body display device and/or the scooter body control device arranged between two handle levers to a power source as well as a control unit in the chassis.

In the foldable mechanism of a foldable handle of a self-balancing electrical scooter, the transmission cable is arranged in a foldable tube that is clamped in the cable hole on the sealing member of the foldable mechanism, and sealing is formed between the cable hole and an outer wall of the foldable tube. On one hand, the transmission cable is effectively prevented from being exposed; on the other hand, the foldable tube can stretch along with folding of the upper handle bar and the lower handle bar, so that the folding of the upper handle bar and the lower handle bar would not damage the transmission cable.

BRIEF DESCRIPTION OF THE DRAWINGS

The characteristics and advantages of the present invention can be understood more clearly by referring to the appended drawings, which is illustrative and not to be interpreted as any restriction to the present invention. In the drawings.

Wherein, 101 represents a stator, 102 represents a position limiting component between the stator and the rotor, 103 represents a limiting cover, 104 represents screw bolts for fastening the limiting cover, 105 represents a limiting pin, 106 represents a handle base, 107 represents a scooter body, 108 represents screw bolts for fastening the signal capturing and processing unit onto the stator, 109 represents a pedestal of the signal capturing and processing unit, 110 represents bolts for fastening the stator onto the scooter body, 111 represents a resilient recoverable unit, 112 represents a rotor, 113 represents a magnet bracket, 114 represents a magnet, 115 represents a linear Hall sensor, 201 represents a foot pedal, 200 represents a gravity sensing assembly, 202 represents a chassis, 203 represents a resilient unit, 204 represents a signal blocking unit, 205 represents an optical signal emitter, 206 represents an optical signal receiver, 207 represents a signal transmission port, 208 represents a circuit board, 210 represents a signal sensing device, 301 represents a split pin, 302 represents a scooter body, 303 represents a axle sleeve, 304 represents a wheel, 305 represents an adjusting steel sheet, 306 represents a crescent unit, 307 represents a flange nut, 308 represents a groove on the surface of the axle sleeve, 309 represents a wheel axle, 401 represents an upper handle bar, 402 represents a hinge, 403 represents screw bolts for fastening the hinge onto the upper handle bar and the lower handle bar, 404 represents a sealing member, 405 represents a buckle bracket, 406 represents screw bolts for fastening the buckle bracket onto the handle, 407 represents a lower handle bar, 408 represents a buckle locking member, 409 represents a buckle ring, 410 represents a buckle hook, 411 represents screw bolts for fastening the buckle hook onto the handle bar, 412 represents a hand-held part, 413 represents a handle lever, 414 represents a power source and signal transmission control interface port, 415 represents a handle base, 416 represents a screw bolt for fastening the handle onto the handle base, 417 represents a portion of the hand-held part pluggable to the handle, 418 represents a portion of the base pluggable to the handle, 419 represents a portion of the handle pluggable to the hand-held part, 420 represents a portion of the handle pluggable to the base, 421 represents a groove on the handle bar, 422 represents an decorative LED lamp mounted on the groove wall of the handle bar, 423 represents transparent silicone coated outside the decorative LED lamp in the groove of the handle bar, 501 represents a screw bolt, 502 represents a motor lateral cover, 503 represents a motor bracket, 504 represents a bearing, 505 represents a bearing sleeve, 506 represents a pin, 507 represents a motor shaft, 508 represents a cable positioning hole, 509 represents a connecting cable, 510 represents a wheel hub, 511 represents a magnetic steel sheet, 601 represents an upper hinge piece, 602 represents a lower hinge piece, 603 represents screw bolts for fastening the hinge, 604 represents a rotation shaft for connecting the upper and lower hinge pieces, 605 represents a handle bar, 606 represents screw bolts for fastening the buckle hook, 607 represents a buckle hook, 608 represents a buckle ring, 609 represents a sealing member, 610 represents a buckle rotation shaft, 611 represents fastening screw bolts for fastening the buckle lower casing, 612 represents a buckle locking piece pressing portion, 613 represents a spring set on the buckle locking piece, 614 represents a buckle upper casing, 615 represents a buckle lower casing, 616 represents a buckle locking piece.

DETAILED DESCRIPTION OF EMBODIMENTS

Hereinafter, the embodiments of the present invention are described in detail with reference to the appended drawings.

Embodiment 1

Figure 1:
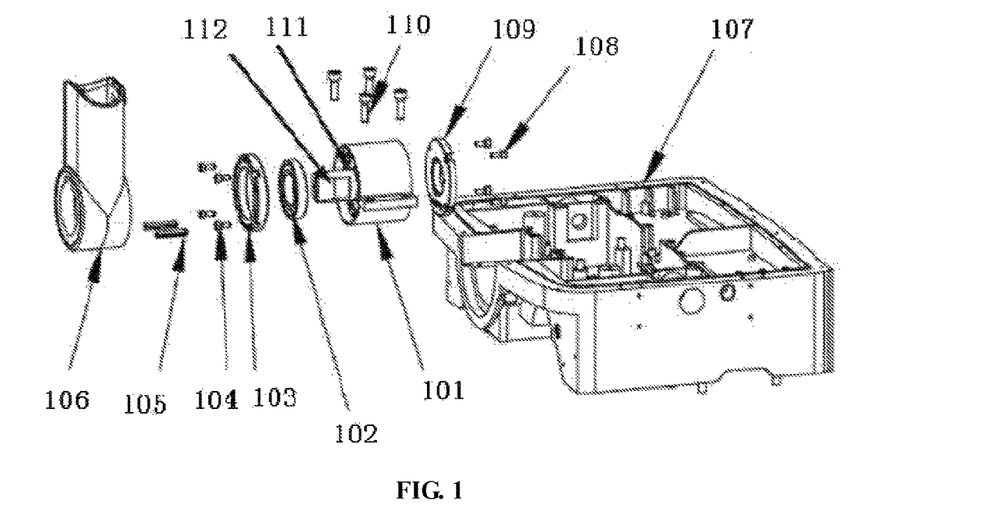
FIG. 1 is a schematic diagram of an assembly for controlling a travel direction of a self-balancing double-wheeled electrical scooter according to an embodiment of the present invention.

A resilient recoverable component provided between a scooter body and a handle is utilized to form an assembly for controlling a travel direction of a self-balancing double-wheeled electrical scooter. The handle is drives the resilient recoverable component to control the travel direction of the scooter. The resilient recoverable component comprises a stator, a rotor and a resilient recoverable unit, the rotor is disposed inside the stator, the rotor is mechanically connected to the handle in a fixed manner, the stator is mechanically connected to the scooter body in a fixed manner, the inner surface of the stator and the outer surface of the rotor are provided with dented patterns, the stator and the rotor are connected in a resilient manner by means of a rubber unit, as the resilient recoverable unit, injection molded in their gap. The stator and the rotor are connected integrally via the resilient recoverable unit. The rotor driven by an external force rotates relative to its initial position, causing the resilient recoverable unit to deform, and when the external driving force exerted on the rotor weakens or disappears, the elastic recovery force of the resilient recoverable unit causes the rotor to move towards its initial position or return to its initial position. A position limiting component is provided between the stator and the rotor, for preventing all movements of the rotor relative to the stator other than rotation. A limiting pin is mechanically fixed to the rotor, a limiting cover is provided on the stator, a limiting hole is provided on the limiting cover, and, driven by the rotor, the limiting pin is able to rotate within an angle range from −30° to 30° in the limiting hole on the limiting cover.

Embodiment 2

Figure 2:
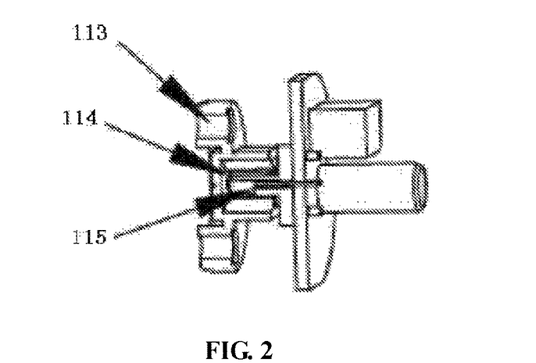
FIG. 2 is a sectional view of a device for collecting information of change of handle position that is set on the assembly for controlling a travel direction of a self-balancing double-wheeled electrical scooter.
Figure 3:
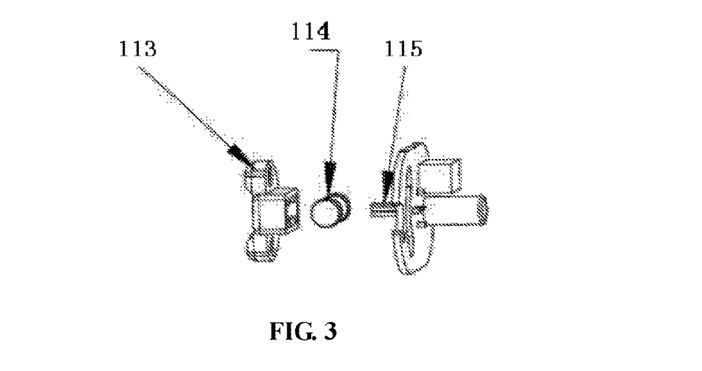
FIG. 3 is an exploded view of a device for collecting information of change of handle position that is set on an assembly for controlling a travel direction of a self-balancing double-wheeled electrical scooter.

A device for collecting information of change of handle position is set on the resilient recoverable component between the scooter body and the handle. The device for collecting information of change of handle position comprises a signal capturing and processing unit and a signal emitting unit. The signal emitting unit is a pair of magnets that are arranged in a central symmetric manner and are directly provided on the stator which is mechanically connected to the handle in a fixed manner directly, the symmetric center of the magnets is a rotation center of the rotor. The signal capturing and processing unit is a linear Hall sensor is provided at a location corresponding to the symmetric center of the magnets and on a stator cover of the stator which is mechanically connected to the scooter body in a fixed manner directly. The rotation of the rotor relative to the stator drives the signal emitting unit to rotate relative to the signal capturing and processing unit, the signal emitting unit emits different signals associated with its different positions relative to the signal capturing and processing unit during its rotation process, the signal capturing and processing unit captures and processes different signals and then transmits corresponding information to a control unit, the control unit processes and transmits corresponding information to motors, and accordingly the motors drive the two wheels differently.

Embodiment 3

Figure 4:
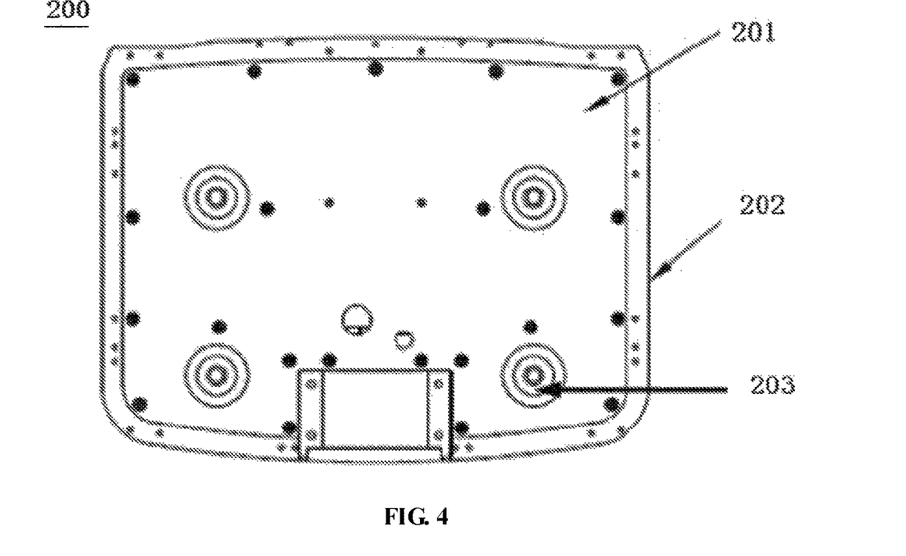
FIG. 4 is a top view after mounting of an assembly for turning on and turning off operation of a self-balancing double-wheeled electrical scooter according to an embodiment of the present invention.
Figure 5:
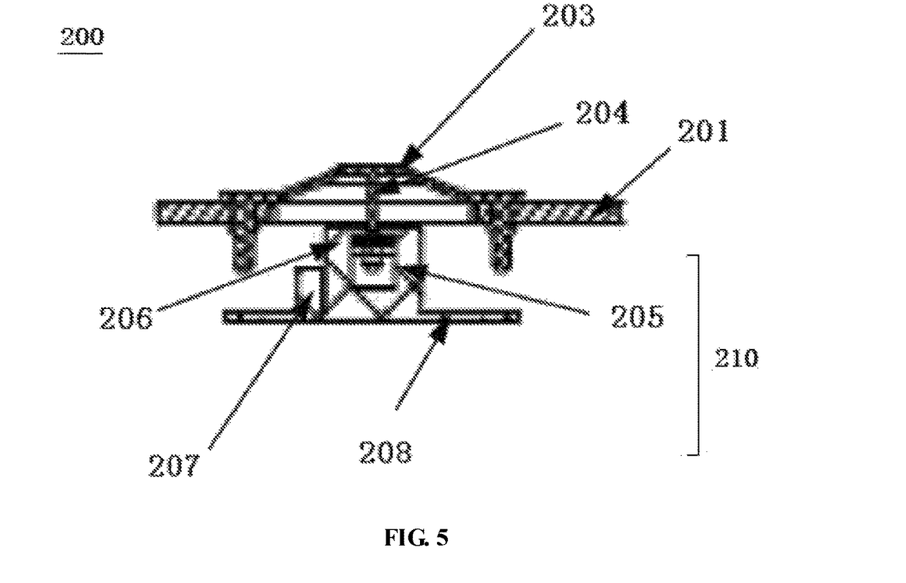
FIG. 5 is a sectional view of an assembly for turning on and turning off operation of a self-balancing double-wheeled electrical scooter according to an embodiment of the present invention.

A signal sensing device, a resilient unit and a signal blocking unit constitute an assembly for turning on and turning off operation of a self-balancing double-wheeled electrical scooter. The signal sensing device is set in a chassis of the self-balancing double-wheeled electrical scooter under a foot pedal, the resilient unit is arranged above the signal sensing device and directly facing the signal sensing device, the signal blocking unit is connected to the resilient unit in a fixed manner and is arranged under the resilient unit and perpendicularly corresponding to a signal transmission path of the signal sensing device. The signal sensing device is set in the chassis of the self-balancing double-wheeled electrical scooter, the foot pedal on the chassis is provided with an aperture which is correspondingly located above the signal transmission path of the signal sensing device, the resilient unit is arranged above the aperture of the foot pedal in a protruding manner, the signal blocking unit on the resilient unit is arranged to extend through the aperture, when the resilient unit is deformed downwards by an external force, the signal blocking unit blocks the sensing signal of the signal sensing device. The signal sensing device comprises a circuit board, as well as an optical signal emitter, an optical signal receiver, a signal transmission port, a current-limiting resistor, a filter capacitor, a load resistor which are all mounted on the circuit board. After electrical power is filtered by the filter capacitor and current-limited by the current-limiting resistor and then fed to the optical signal emitter, the optical signal emitter sends a sensing signal in the form of light to the optical signal receiver, the optical signal receiver converts the received optical signal into electrical current signal which is then converted into voltage signal via the load resistor and transmitted to the signal transmission port and after that sent to a controller of the self-balancing double-wheeled electrical scooter, and when the controller receives the voltage signal, the operation of the self-balancing double-wheeled electrical scooter is controlled at a shut-down state. In the process of the optical signal emitter transmitting a sensing signal in the form of light to the optical signal receiver, if the emitted signal gets blocked by the signal blocking unit, the optical signal receiver is unable to receive any corresponding signal, so that the controller does not receive any corresponding voltage signal, and thus the operation of the self-balancing double-wheeled electrical scooter is controlled at an actuated state.

Embodiment 4

Figure 6:
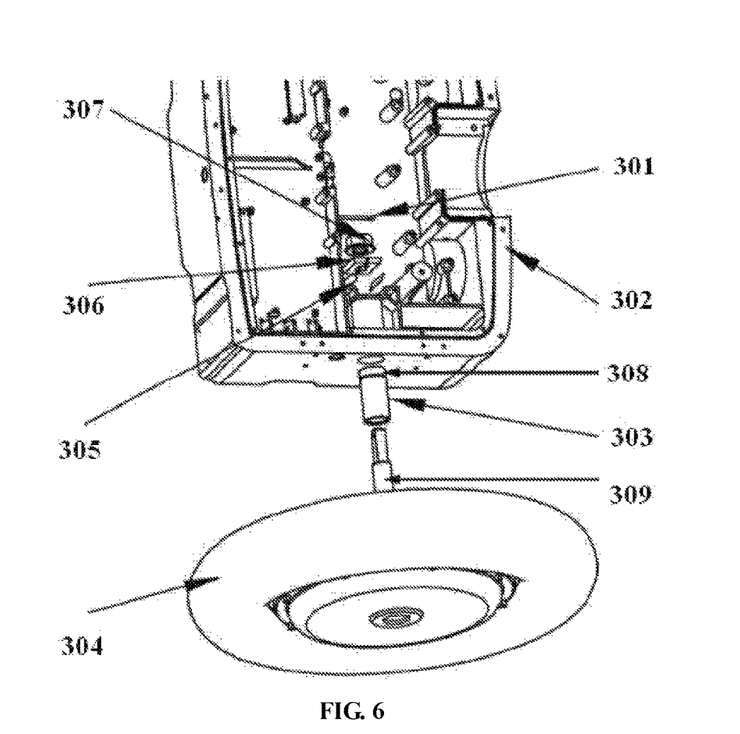
FIG. 6 is an exploded view of respective components of a fixed connection structure between a wheel and a scooter body of an electrical scooter.
Figure 7:
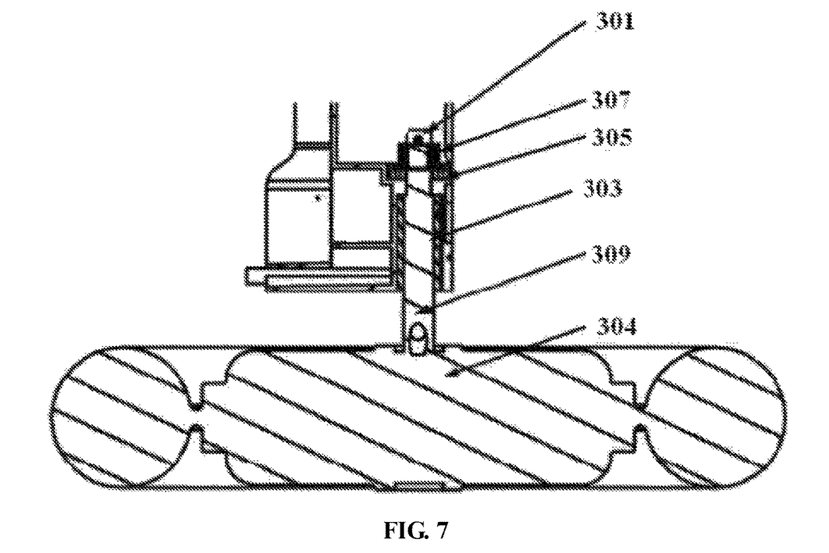
FIG. 7 is a sectional view of a fixed connection structure between a wheel and a scooter body of an electrical scooter.
Figure 8:
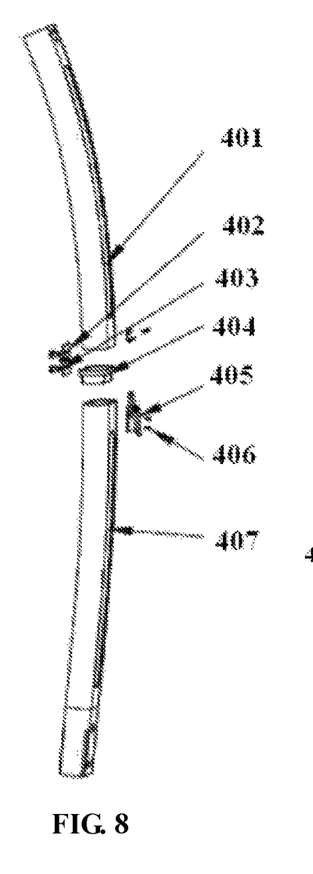
FIG. 8 is an exploded view of an upper handle bar, a lower handle bar and a foldable mechanism according to an embodiment of the present invention.
Figure 9:
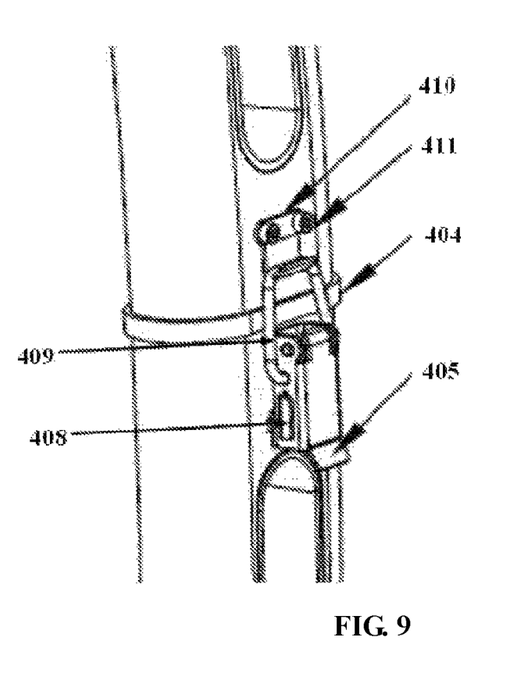
FIG. 9 is a schematic diagram of the foldable mechanism according to an embodiment of the present invention.
Figure 10:
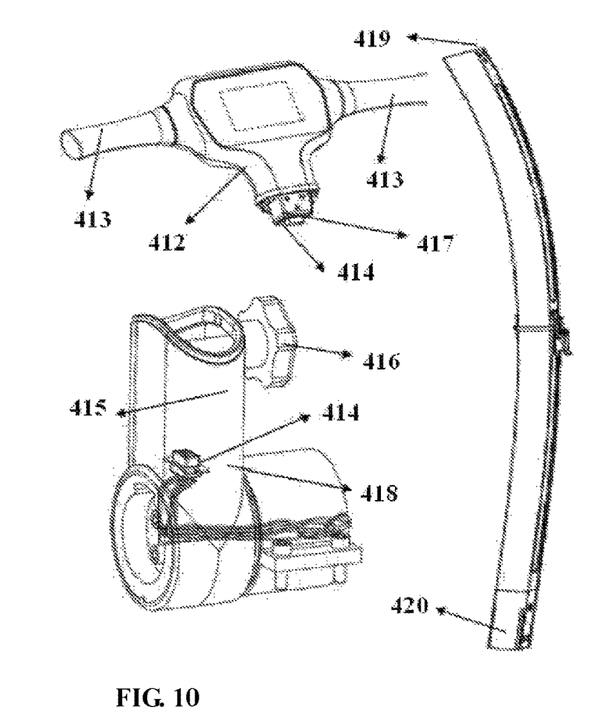
FIG. 10 is an exploded view of respective components of a foldable handle according to an embodiment of the present invention.
Figure 11:
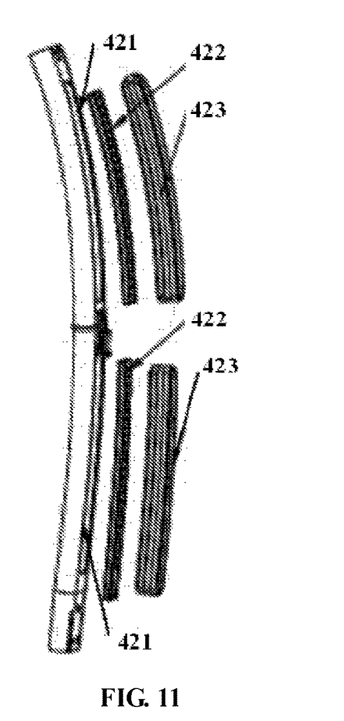
FIG. 11 is a schematic diagram of foldable handle bars with LED lamps according to an embodiment of the present invention.

A fixed connection structure between a wheel and a scooter body of a self-balancing double-wheeled electrical scooter comprises a flange nut, a crescent unit, an adjusting steel sheet and an axle sleeve. The axle sleeve is made of material harder than the scooter body, and an outer surface of the axle sleeve is rough or has dented portions thereon. An inner bore of the axle sleeve has unequal diameters at its two ends, with the diameter at the end near the wheel larger than that of the end away from the wheel, and the line connecting the peripheries of the two ends has an angle of 1° to 3° relative to a horizontal plane. The scooter body is fixed to the axle sleeve by pressure casting. In the crescent unit of the fastening component that fastens the wheel axle to the scooter body, the surface opposite a concave portion of a crescent piece thereof is a slanted surface which skews towards the axle on a side near the wheel, and the surface with the screw hole on the scooter body also has slanted portions. When the flange nut pushes the crescent pieces to screw toward the wheel, because the surface with the screw hole has slanted portions, the screw hole becomes smaller and smaller. The adjusting steel sheet is fitted between the crescent unit and the scooter body. The corresponding surface on the scooter body skews towards the axle on a side near the wheel in a manner corresponding to that of the crescent piece. Therefore, during a continuous screwing-in process, the contact between the flange nut and the crescent unit, between the crescent unit and the axel, between the crescent unit and the adjusting steel sheet, as well as between the adjusting steel sheet and the scooter body would become more and more firm. In the fastening component that fastens the wheel axle to the scooter body, the axel is provided with a hole at a position behind the flange nut and adjacent the flange nut, the fastening component further comprises a split pin which is set in the hole of the axel. The split pin is configured to prevent the flange nut from being screwed out. By further providing a split pin on the axel to secure the flange nut, the flange nut is prevented from loosening, and screwing out of the flange nut is effectively prevented.

Embodiment 5

A foldable handle comprises an upper handle bar, a lower handle bar, a foldable mechanism between the upper and lower handle bars, and a hand-held part, the upper handle bar and the lower handle bar are connected in a foldable manner by the foldable mechanism. The foldable mechanism comprises a foldable member, a connecting fastener and a sealing member. The foldable member a hinge which comprises an upper hinge piece, a lower hinge piece and a rotation shaft for connecting the upper and lower hinge pieces, the upper hinge piece and the lower hinge piece are respectively fixed on the upper handle bar and the lower handle bar. The connecting fastener is arranged for connecting the upper handle bar and the lower handle bar in a fixed manner, and comprises a buckle hook, a buckle ring, a buckle bracket and a buckle locking member, with the buckle hook fixed on one of the upper and lower handle bars, and with the buckle ring, the buckle bracket and the buckle locking member fixed on the other of the upper and lower handle bars, the buckle ring is able to be buckled onto the buckle hook so as to form fixed connection between the upper and lower handle bars, the buckle ring is mechanically connected to the buckle bracket in a rotatable manner, and the buckle bracket is locked by the buckle locking member. The sealing member is made of rubber and is fixed in a sealed manner around a connecting interface between the upper handle bar and the lower handle bar. The sealing member is made of rubber or silicone, with a cable hole provided thereon for a transmission cable to pass through. The transmission cable is arranged in a foldable tube that is clamped in the cable hole, and sealing is formed between the cable hole and an outer wall of the foldable tube. The hand-held part is mechanically fixed to the upper handle bar, and comprises two handle levers as well as a scooter body display device and/or a scooter body control device arranged between the two handle levers, the scooter body control device comprises a scooter body Bluetooth control unit, a scooter remote upgrade control unit, and a scooter power source remote switch unit. The upper handle bar and the lower handle bar are respectively provided with a groove, a decorative LED lamp is further received in the groove, and transparent silicone is provided on the outside for encapsulating the LED lamp inside the groove. The handle is provided with a power source port and a signal transmission control interface port, the handle is further provided with a handle base connected to the scooter body, the power source port and signal transmission control interface port of the handle are connected to corresponding ports of the handle base in a pluggable manner, and the handle and the handle base are further mechanically connected in a fixed manner by screw bolts.

Embodiment 6

Figure 12:
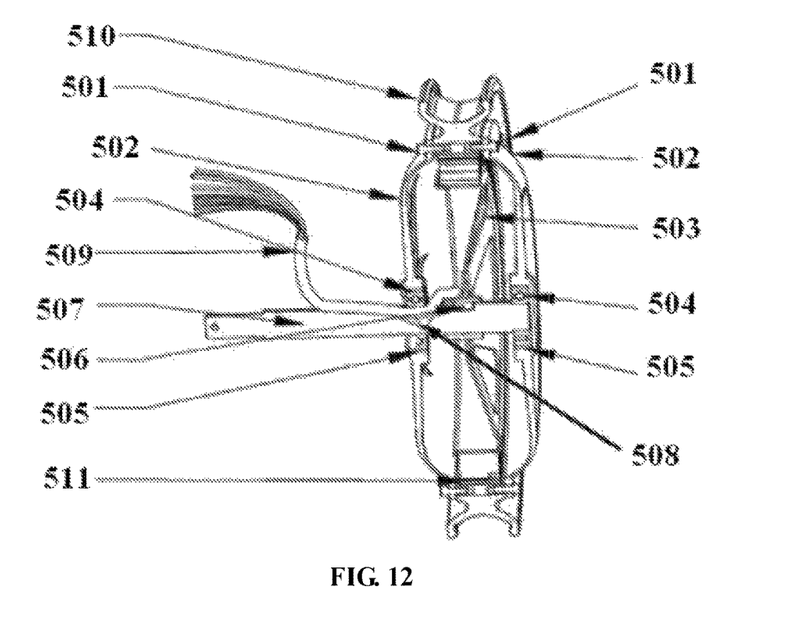
FIG. 12 is a sectional view of a connection structure between a motor shaft of a hub motor and a wheel of a self-balancing double-wheeled electrical scooter.
Figure 13:
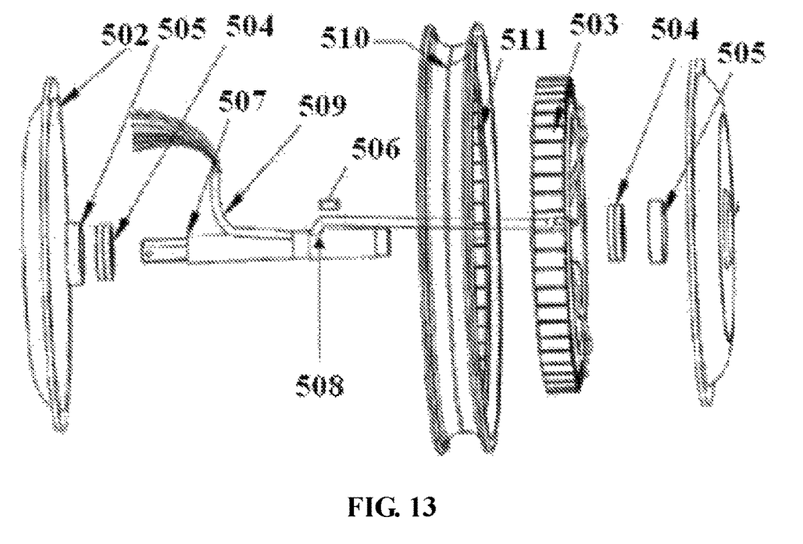
FIG. 13 is an exploded view of a connection structure between a motor shaft of a hub motor and a wheel of a self-balancing double-wheeled electrical scooter.

The difference value between the diameter of a motor shaft of a hub motor and the diameter of a central hole of a wheel motor bracket in a self-balancing double-wheeled electrical scooter is 0.3 mm. The motor shaft is fixed at a center of the motor bracket of the wheel and extending inside the central hole of the motor bracket, with the diameter of the central hole of the motor bracket smaller than the diameter of the motor shaft, the motor shaft is pressed into the central hole of the motor bracket. The wheel motor shaft is provided with a bore which communicates with a corresponding bore on the inner wall of the central hole of the wheel motor bracket for fixing the motor shaft, and a pin is inserted within the bore. Wheel lateral covers are mechanically connected to the motor shaft through bearings, and interference-fit connections are formed between the wheel lateral covers and the bearings as well as between the bearings and the motor shaft, The diameter interference values between the bearings and the wheel lateral covers as well as the diameter interference values between the motor shaft and the bearings are all controlled at about 0.3 mm. The motor shaft is further provided with a cable positioning hole for accommodating a connecting cable between the hub motor and the scooter body, the cable positioning hole is arranged at the connecting position of the motor shaft and one of the bearings. The diameter of the cable positioning hole is larger than the outer diameter of the connecting cable between the hub motor and the scooter body, and is smaller than or equal to 1.5 times the outer diameter of the connecting cable between the hub motor and the scooter body. The length of the cable positioning hole is larger than the bearing width plus 2 times the outer diameter of the connecting cable between the hub motor and the scooter body, the bearing is disposed upon the cable positioning hole, with two ends of the cable positioning hole arranged on the inner side and outer side of the bearing.

Embodiment 7

Figure 14:
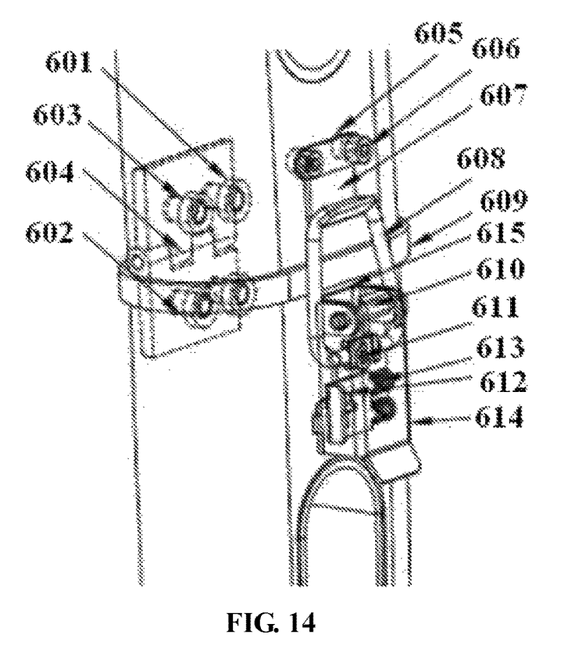
FIG. 14 is a schematic diagram of a foldable mechanism according to an embodiment of the present invention.
Figure 15:
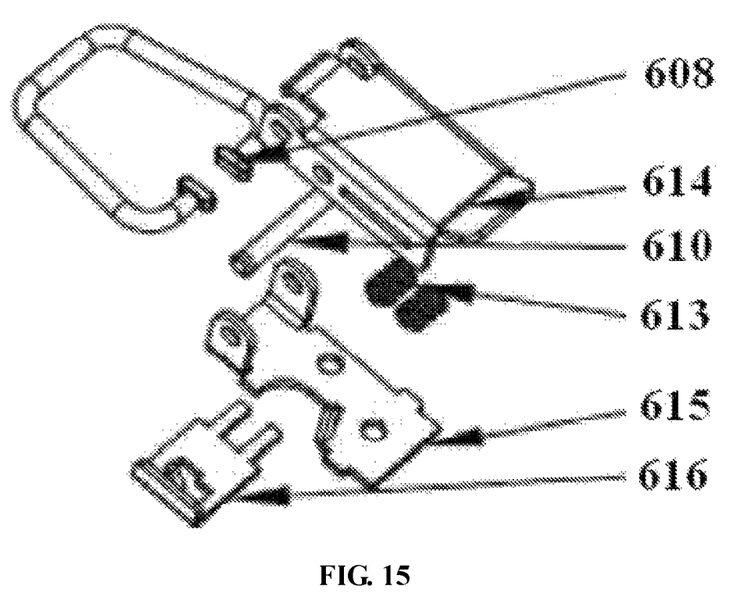
FIG. 15 is an exploded view of a foldable mechanism according to an embodiment of the present invention.

A foldable member, a connecting fastener and a sealing member constitute a foldable mechanism of a foldable handle of a self-balancing electrical scooter. The foldable member is a hinge which comprises an upper hinge piece, a lower hinge piece and a rotation shaft for connecting the upper and lower hinge pieces, the upper hinge piece and the lower hinge piece are respectively fixed on the upper handle bar and the lower handle bar, for switching the handle between a folded position and a connected position. The connecting fastener comprises a buckle hook, a buckle ring, a buckle bracket and a buckle locking member, with the buckle hook fixed on one of the upper and lower handle bars, and with the buckle ring, the buckle bracket and the buckle locking member fixed on the other of the upper and lower handle bars, the buckle ring is able to be buckled onto the buckle hook so as to form fixed connection between the upper and lower handle bars, the buckle ring is mechanically connected to the buckle bracket in a rotatable manner, and the buckle bracket is locked by the buckle locking member, for fastening respective sections of the handle into the connected position. The sealing member is arranged to seal a connecting interface between an upper handle bar and a lower handle bar. The buckle bracket comprises a buckle upper casing and a buckle lower casing, the buckle lower casing is fixed on the handle, the buckle upper casing is connected on the buckle lower casing in a rotatable manner by means of a buckle rotation shaft, the buckle ring is connected on the buckle upper casing in a rotatable manner, when the buckle upper casing is opened, the buckle ring is at an entering position corresponding to the buckle hook, when the buckle upper casing is then closed, the buckle ring becomes connected to the buckle hook in a fixed manner, and when the buckle upper casing is opened again, the buckle ring slides off from the buckle hook. The buckle locking member comprises a spring, a buckle locking piece and a buckle locking hook, the buckle locking piece is set on the buckle upper casing, the spring is set on the buckle locking piece, the buckle locking hook is set on the buckle lower casing, and the buckle upper casing is locked onto the buckle lower casing by means of the buckle locking piece being hooked onto the buckle locking hook. The buckle locking piece comprises a buckle locking piece pressing portion, a buckle locking piece aperture and buckle locking piece horns, the spring comprises two springs arranged in parallel, the buckle locking piece is transversely inserted in the buckle upper casing, with the buckle locking piece pressing portion placed outside one lateral side of the buckle upper casing, and with the buckle locking piece horns extending out from the other lateral side of the buckle upper casing, the springs are set on the buckle locking piece horns inside the buckle upper casing, with one end of the spring pushed against the starting end of the buckle locking piece horn, and with the other end of the spring pushed against an inner lateral wall of the buckle upper casing, the buckle locking piece aperture is provided with a protrusion for restraining the buckle locking piece horns from completely entering the buckle upper casing, this protrusion abuts an inner side of the buckle upper casing opposite the buckle locking piece pressing portion when the springs stretches to a maximum extent within the buckle locking member, the buckle locking hook hooks itself onto an edge of the buckle locking piece aperture when the buckle upper casing is closed, and when the buckle locking piece pressing portion is pressed, displacement of the buckle locking piece aperture occurs, causing the buckle locking hook to break away from the edge of the buckle locking piece aperture and enter the buckle locking piece aperture, so that the buckle upper casing becomes free to be opened. The sealing member is made of elastic waterproof material such as rubber, with a cable hole provided thereon for a transmission cable to pass through. The transmission cable is arranged in a foldable tube that is clamped in the cable hole, and sealing is formed between the cable hole and an outer wall of the foldable tube.

Although the embodiments of the present invention has been described in conjunction with the appended drawings, those skilled in the art can make various changes and modifications without deviating form the concept and scope of the present invention, and such changes and modifications are all intended to be embraced within the scope defined by the appended claims.

The invention claimed is:

1. An assembly for turning on and turning off operation of a self-balancing double-wheeled electrical scooter, characterized in that, the assembly is a gravity sensing assembly controlled by a foot of a rider, which comprises a signal sensing device, a resilient unit and a signal blocking unit, the signal sensing device is set in a chassis of the self-balancing double-wheeled electrical scooter under a foot pedal, the resilient unit is arranged above the signal sensing device and directly facing the signal sensing device, the signal blocking unit is fixedly connected to the resilient unit and is arranged under the resilient unit and perpendicularly corresponding to a signal transmission path of the signal sensing device.

2. The assembly for turning on and turning off operation of a self-balancing double-wheeled electrical scooter according to claim 1, characterized in that, the signal sensing device comprises a circuit board, as well as an optical signal emitter, an optical signal receiver, a signal transmission port, a current-limiting resistor, a filter capacitor, a load resistor which are all mounted on the circuit board.

3. The assembly for turning on and turning off operation of a self-balancing double-wheeled electrical scooter according to claim 2, characterized in that, after electrical power is filtered by the filter capacitor and current-limited by the current-limiting resistor and then fed to the optical signal emitter, the optical signal emitter is configured to send a sensing signal in the form of light to the optical signal receiver, the optical signal receiver is configured to convert the received optical signal into electrical current signal which is then converted into voltage signal via the load resistor and transmitted to the signal transmission port and after that sent to a controller of the self-balancing double-wheeled electrical scooter, and when the controller receives the voltage signal, the operation of the self-balancing double-wheeled electrical scooter is controlled at a shut-down state.

4. The assembly for turning on and turning off operation of a self-balancing double-wheeled electrical scooter according to claim 3, characterized in that, the signal sensing device is set in the chassis of the self-balancing double-wheeled electrical scooter, the foot pedal on the chassis is provided with an aperture which is correspondingly located above the signal transmission path of the signal sensing device, the resilient unit protrudes above the aperture of the foot pedal, the signal blocking unit on the resilient unit is arranged to extend through the aperture, when the resilient unit is deformed downwards by an external force, the signal blocking unit is configured to block the sensing signal of the signal sensing device.

5. The assembly for turning on and turning off operation of a self-balancing double-wheeled electrical scooter according to claim 4, characterized in that, when the sensing signal of the signal sensing device is blocked by the signal blocking unit, the optical signal sent by the optical signal emitter cannot be transmitted to the optical signal receiver, so that the controller of the self-balancing double-wheeled electrical scooter does not receive any voltage signal from the signal sensing device, thereby the operation of the self-balancing double-wheeled electrical scooter is controlled at an actuated state.

6. The assembly for turning on and turning off operation of a self-balancing double-wheeled electrical scooter according to claim 4, characterized in that, the resilient unit is fixed to and sealed against the foot pedal.

7. The assembly for turning on and turning off operation of a self-balancing double-wheeled electrical scooter according to claim 6, characterized in that, a foot pad is further provided above the resilient unit on the foot pedal, when no downward force is exerted on the foot pad, there is no action of interaction force between the foot pad and the resilient unit or their interaction force is not enough to deform the resilient unit, causing the operation of the self-balancing double-wheeled electrical scooter to be at a shut-down state.

8. A self-balancing double-wheeled electrical scooter, characterized in comprising one or more assemblies for turning on and turning off operation of the self-balancing double-wheeled electrical scooter according to claim 1, when the sensing signal of at least one signal sensing device is blocked by the signal blocking unit, the operation of the self-balancing double-wheeled electrical scooter enters an actuated state.

9. The self-balancing double-wheeled electrical scooter according to claim 8, characterized in comprising a connection structure between a motor shaft of a hub motor and a wheel, wherein, a motor bracket of the wheel is connected to a stator of the hub motor, the motor shaft is fixed at a center of the motor bracket of the wheel and extending inside a central hole of the motor bracket, with the diameter of the central hole of the motor bracket smaller than the diameter of the motor shaft, the motor shaft is pressed into the central hole of the motor bracket, the motor shaft is provided with a bore which communicates with a corresponding bore on the inner wall of the central hole of the motor bracket, and a pin is inserted within the bore.

10. The self-balancing double-wheeled electrical scooter according to claim 9, characterized in that, the motor shaft is further provided with a cable positioning hole for accommodating a connecting cable between the hub motor and the scooter body, the cable positioning hole is arranged at the connecting position of the motor shaft and one of the bearings.

11. The self-balancing double-wheeled electrical scooter according to claim 8, characterized in comprising a foldable mechanism of a foldable handle, wherein, the foldable mechanism comprises a foldable member, a connecting fastener and a sealing member, the foldable member switches the handle between a folded position and a connected position, the connecting fastener is arranged to fasten the handle into the connected position, the sealing member is arranged to seal a connecting interface between an upper handle bar and a lower handle bar.

* * * * *